United States Patent
Srinivasan et al.

(10) Patent No.: US 7,617,235 B2
(45) Date of Patent: Nov. 10, 2009

(54) METHOD AND SYSTEM FOR CREATING A DOMAIN INDEX

(75) Inventors: Jagannathan Srinivasan, Nashua, NH (US); Seema Sundara, Nashua, NH (US); Nipun Agarwal, Santa Clara, CA (US); Ying Hu, Nashua, NH (US); Timothy Chorma, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 450 days.

(21) Appl. No.: 11/104,718

(22) Filed: Apr. 12, 2005

(65) Prior Publication Data

US 2005/0182762 A1 Aug. 18, 2005

(51) Int. Cl.
*G06F 17/30* (2006.01)
(52) U.S. Cl. ...................................... 707/102
(58) Field of Classification Search .............. 707/1, 707/6, 7, 100, 101, 102, 2, 3, 4, 203; 715/105, 715/234; 709/220, 223, 246; 712/34; 717/109
See application file for complete search history.

(56) References Cited

U.S. PATENT DOCUMENTS

| | | | |
|---|---|---|---|
| 5,023,777 A * | 6/1991 | Sawamoto | 711/2 |
| 5,485,608 A | 1/1996 | Lomet et al. | |
| 5,485,610 A | 1/1996 | Gioielli et al. | |
| 5,524,205 A | 6/1996 | Lomet et al. | |
| 5,664,172 A | 9/1997 | Antoshenkov | |
| 5,731,814 A | 3/1998 | Bala | |
| 5,742,706 A | 4/1998 | Yu | |
| 5,848,408 A | 12/1998 | Jakobsson et al. | |
| 5,852,818 A | 12/1998 | Guay et al. | |
| 5,857,180 A | 1/1999 | Hallmark et al. | |
| 5,870,759 A | 2/1999 | Bauer et al. | |
| 5,870,765 A | 2/1999 | Bauer et al. | |
| 5,884,325 A | 3/1999 | Bauer et al. | |
| 5,920,868 A | 7/1999 | Fowlow et al. | |
| 5,926,816 A | 7/1999 | Bauer et al. | |
| 5,960,194 A * | 9/1999 | Choy et al. | 707/102 |
| 6,006,234 A | 12/1999 | Govindarajan et al. | |
| 6,014,614 A | 1/2000 | Herring et al. | |
| 6,014,656 A | 1/2000 | Hallmark et al. | |
| 6,061,690 A | 5/2000 | Nori et al. | |
| 6,105,026 A | 8/2000 | Kruglikov et al. | |
| 6,112,201 A | 8/2000 | Wical | |
| 6,161,105 A | 12/2000 | Keighan et al. | |
| 6,223,182 B1 | 4/2001 | Agarwal et al. | |
| 6,240,410 B1 | 5/2001 | Wical | |
| 6,240,428 B1 | 5/2001 | Yeung et al. | |

(Continued)

OTHER PUBLICATIONS

Torsten Grust et al., "Why off-the-shelf RDBMSs are better at XPath than you might expect", 2007, ACM, NY, NY, pp. 949-958.*

(Continued)

*Primary Examiner*—Diane Mizrahi
(74) *Attorney, Agent, or Firm*—Vista IP Law Group, LLP

(57) ABSTRACT

A domain index for a partitioned database can be created using a user-defined indexing scheme. Partition maintenance operations performed on the partitioned database objects cause corresponding partition maintenance operations to be performed on the domain indexes. The user-supplied partitioning code is partition operation-unaware.

27 Claims, 4 Drawing Sheets

U.S. PATENT DOCUMENTS

| | | |
|---|---|---|
| 6,272,503 B1 | 8/2001 | Bridge, Jr. et al. |
| 6,338,056 B1 * | 1/2002 | Dessloch et al. ............... 707/2 |
| 6,370,529 B1 | 4/2002 | Kruglikov et al. |
| 6,374,232 B1 | 4/2002 | Dageville et al. |
| 6,381,605 B1 | 4/2002 | Kothuri et al. |
| 6,389,410 B1 | 5/2002 | Gupta |
| 6,401,083 B1 | 6/2002 | Agarwal et al. |
| 6,405,284 B1 | 6/2002 | Bridge |
| 6,430,571 B1 | 8/2002 | Doan et al. |
| 6,438,562 B1 | 8/2002 | Gupta et al. |
| 6,439,783 B1 | 8/2002 | Antoshenkov |
| 6,470,344 B1 | 10/2002 | Kothuri et al. |
| 6,484,179 B1 | 11/2002 | Roccaforte |
| 6,502,089 B1 | 12/2002 | Amundsen et al. |
| 6,505,205 B1 | 1/2003 | Kothuri et al. |
| 6,530,035 B1 | 3/2003 | Bridge |
| 6,542,854 B2 | 4/2003 | Yang et al. |
| 6,549,901 B1 | 4/2003 | Loaiza et al. |
| 6,553,369 B1 | 4/2003 | Guay et al. |
| 6,574,717 B1 | 6/2003 | Ngai et al. |
| 6,587,854 B1 | 7/2003 | Guthrie et al. |
| 6,606,638 B1 | 8/2003 | Tarin |
| 6,609,131 B1 | 8/2003 | Zaig et al. |
| 6,618,822 B1 | 9/2003 | Loaiza et al. |
| 6,622,138 B1 | 9/2003 | Bellamkonda et al. |
| 6,636,870 B2 | 10/2003 | Roccaforte |
| 6,665,684 B2 | 12/2003 | Zaite et al. |
| 6,920,460 B1 * | 7/2005 | Srinivasan et al. .......... 707/102 |
| 2001/0054034 A1 | 12/2001 | Arning et al. |
| 2002/0178394 A1 | 11/2002 | Bamberger et al. |
| 2004/0078750 A1 * | 4/2004 | Frank ......................... 715/500 |
| 2004/0225865 A1 * | 11/2004 | Cox et al. ..................... 712/34 |

OTHER PUBLICATIONS

Agrawal, S. et al., "Integrating Vertical and Horizontal Partitioning into Automated Physical Database Design." Proceedings of the 2004 ACM SIGMOD Conference, Paris, France, Jun. 13-18, 2004, pp. 359-370.

Hjaltason, G. et al. "Speeding up construction of PMR quadtree-based spatial indexes." VLDB Journal (2002) vol. 11, pp. 109-137.

Leverenz, L. et al., "Partitioned Tables and Indexes" Oracle8 Server Concepts, Release 8.0 (Jun. 1997) pp. 8-1 through 8-40.

Gisli et al., Speeding up construction of PMR quadtree-based spatial indexes, Oct. 2002, Springer-Verlag New York, Inc., vol. 11, issue 2, pp. 190-137.

* cited by examiner

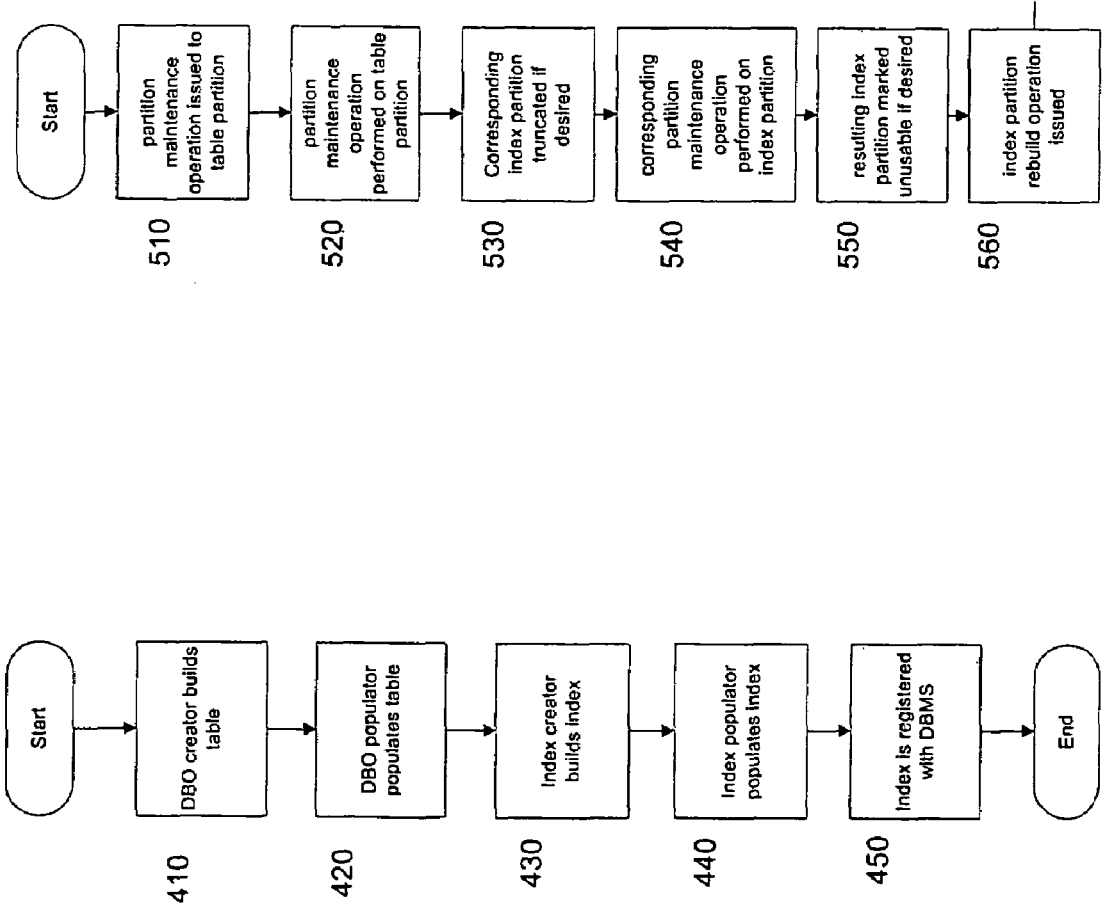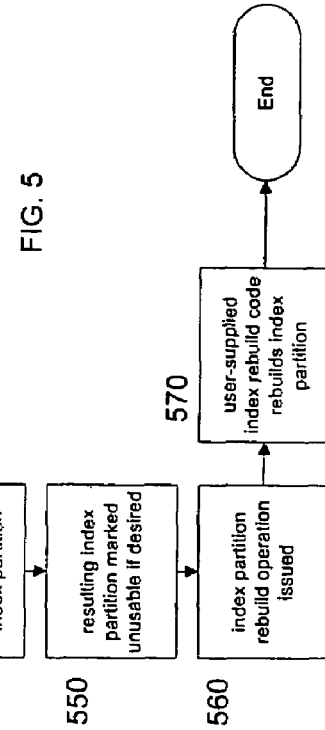

METHOD AND SYSTEM FOR CREATING A DOMAIN INDEX

CROSS-REFERENCED AND RELATED APPLICATIONS

This application claims benefit of application Ser. No. 10/159,360 entitled "Systems and Methods for Managing Partitioned Indexes That Are Created and Maintained by User-Defined Indexing Schemes" filed on May 29, 2002, now issued as U.S. Pat. No. 6,920,460, which is hereby incorporated by reference as if fully set forth herein.

BACKGROUND OF THE INVENTION

Field of the Invention

The invention relates to the field of computer systems, and more particularly to systems and methods of creating a domain index.

When maintaining a database management system ("DBMS"), especially a DBMS adapted to manage very large database objects (e.g. tables, indexes, etc.), it is useful to partition the database object into smaller, more manageable pieces, known as "partitions". A database object can be partitioned into either "horizontal" or "vertical" partitions.

Vertical partitioning encompasses splitting up the columns of the data stored in the database object into groups, and storing each group in a different partition. Horizontal partitioning encompasses splitting up the rows of the data stored in the database object into groups and storing each group in a different partition, according to a partition function. For example, a database object may be horizontally partitioned by range of dates, which splits the data up by the month it was entered into the database object. Alternatively, the database object may be partitioned according to a hashing function, which attempts to distribute the rows of data equally across a specified number of partitions. Many different partitioning functions are possible, depending on the particular design choices made by the database object or DBMS developer. Among the benefits provided by horizontal partitioning is improved query performance through the ability to do partition pruning and partition-wise joins, thereby reducing the number of partitions that a query must process in order to generate a query result set.

The DBMS also provides several partition maintenance operations, to allow, for example, partitions to be: 1) added or deleted, 2) split into multiple partitions, or 3) merged together into a single partition. The mechanics of each of these partition maintenance operations is dependent upon the partitioning method used in partitioning the database object. For example, a split operation would perform one set of actions on a partition created on a date-range, and a different set of actions on a partition created using a hashing function.

Indexes are another useful tool in designing large-scale databases. An index contains a subset of the data stored in a database object, used to more rapidly access and manipulate the data stored in the database object. Indexes are typically themselves stored in database objects, and are associated with the data they index. For example, if a table contains employee data, it may have the following five columns: Employee ID, Employee Name, Employee Address, Supervisor, Telephone Number. An index created on the employee table, indexing the employees by their Supervisor, would contain only two columns: Supervisor and Employee ID. The index could optionally be sorted by Supervisor. Assume a query or a user wanted to, for example, access the employee table and retrieve all employees having "Mary Smith" for a Supervisor.

Since the index contains only a subset of the employee data, it is faster to read the index from long-term storage than it is to read the underlying employee table. Also, since the index is already sorted by Supervisor, it is faster to retrieve the records having "Mary Smith" as Supervisor. Once the appropriate records have been identified by searching the index, then only those records which have "Mary Smith" as Supervisor are retrieved from the employee table, via the Employee ID field stored in the index.

Among the different types of indexes are "native indexes" and "domain indexes". Native indexes are indexes created using indexing schemes built into the DBMS as provided by the DBMS manufacturer. Domain indexes are indexes created using user-defined indexing schemes, provided by users, indexing scheme developers or others outside of the DBMS manufacturer. In domain indexes, the code for index definition, index maintenance, and index scan is provided externally, by an indexing scheme developer or other user of the DBMS. In native indexes, the code for index definition, index maintenance, and index scan is provided internally, by a developer or manufacturer of the DBMS itself.

While partitioned database objects and domain indexes are both useful tools in database design, difficulties arise when a DBMS tries to support domain indexes on partitioned database objects. Database systems typically support multiple partitioning methods, as discussed above. For example, a DBMS may support partitioning a database object such as a table by either "value range", "hash", or "list" schemes, as well as composite partitioning methods such as "rangehash". Each of these partitioning methods typically requires partition maintenance operations that are specific to the partitioning method used.

Conventional DBMS that support domain indexes on partitioned tables typically require the domain index developer to create a separate set of partition maintenance operations for each supported partitioning method. This approach requires the domain index developer to understand all of the details of the various partitioning methods and how they impact the design of partition maintenance operations for the particular partitioning method. Since the partition maintenance operations also have to be incorporated into each domain indexing scheme, this approach also causes wasteful duplication of effort across the different indexing schemes.

Additionally, the conventional approach creates a dependency between the DBMS manufacturer's decision to incorporate additional partitioning methods into the DBMS and the user-defined domain indexing code. Whenever the DBMS manufacturer introduces a new partitioning method, all of the DBMS users have to write new code to implement any desired partition maintenance operations within their domain indexing schemes, for the new partitioning method.

Furthermore, the domain index data itself is typically stored in database objects. A typical implementation has index data for each partition of the underlying database object stored in a separate database object. This approach leads to an explosion of database objects being created to contain the index data, as well as potential creation of a inordinately large number of cursors to process operations on the domain index that span multiple partitions. These situations can cause a significant impact on overall DBMS performance.

Therefore, there is a need for a system of managing domain indexes that allows for domain indexes on partitioned tables without causing a dependency between the introduction of additional partitioning methods and the user-defined indexing code, and that minimizes the amount of code that the user needs to create.

SUMMARY OF THE INVENTION

In an aspect of an embodiment of the invention involves, receiving a user-defined index partitioning scheme, creating a domain index, partitioning the domain index based on the index partitioning scheme, and creating a plurality of index entries based on the index partitioning scheme.

In another aspect of an embodiment a domain indexing system includes a user-defined indexing function, a first database object partitioned according to the domain indexing function and including one or more entries for each record in a second database object.

In another aspect of an embodiment of the invention, the DBMS performs a partition maintenance operation on the first database object, and performs a corresponding partition maintenance operation on the second database object.

BRIEF DESCRIPTION OF THE DRAWINGS

FIG. 4 is a flowchart of a method of creating database objects in a DBMS.

FIG. 5 is a flowchart of a method of maintaining a domain index.

DETAILED DESCRIPTION

Figure 1:
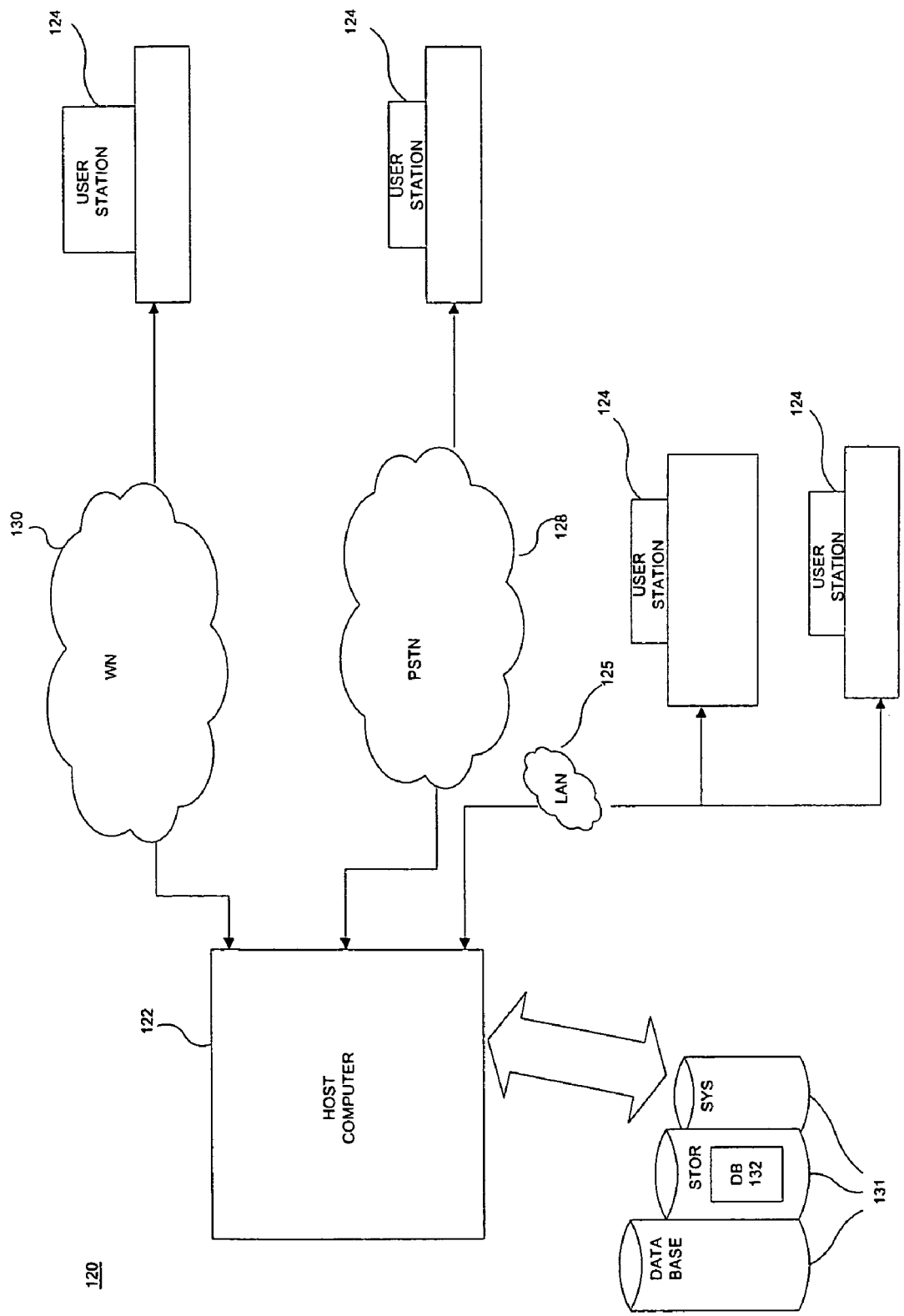
FIG. 1 is a representation of a computer system in accordance with an embodiment of the invention.

Referring to FIG. 1, a computer system 120 constructed in accordance with one preferred embodiment of the present invention includes a host computer 122 connected to a plurality of individual user stations 124. The user stations 124 each comprise suitable data terminals, such as, e.g., personal computers, portable laptop computers, or personal data assistants ("PDAs"), which can store and independently run one or more applications, i.e., programs. For purposes of illustration, some of the user stations 124 are connected to the host computer 122 via a local area network ("LAN") 125. Other user stations 124 are remotely connected to the host computer 122 via a public telephone switched network ("PSTN") 128 and/or a wireless network 130.

The host computer 122 operates in conjunction with a data storage system 131, which contains a database 132 that is readily accessible by the host computer 122. In alternative embodiments, the database 132 may be resident on the host computer, stored, e.g., in the host computer's ROM, PROM, EPROM, or any other memory chip, and/or its hard disk. In yet alternative embodiments, the database 132 may be read by the host computer 122 from one or more floppy disks, flexible disks, magnetic tapes, any other magnetic medium, CD-ROMs, any other optical medium, punch cards, paper tape, or any other physical medium with patterns of holes, or any other medium from which a computer can read. In further alternative embodiments, the host computer 122 can access two or more databases 132, stored in a variety of mediums, as previously discussed.

Figure 2:
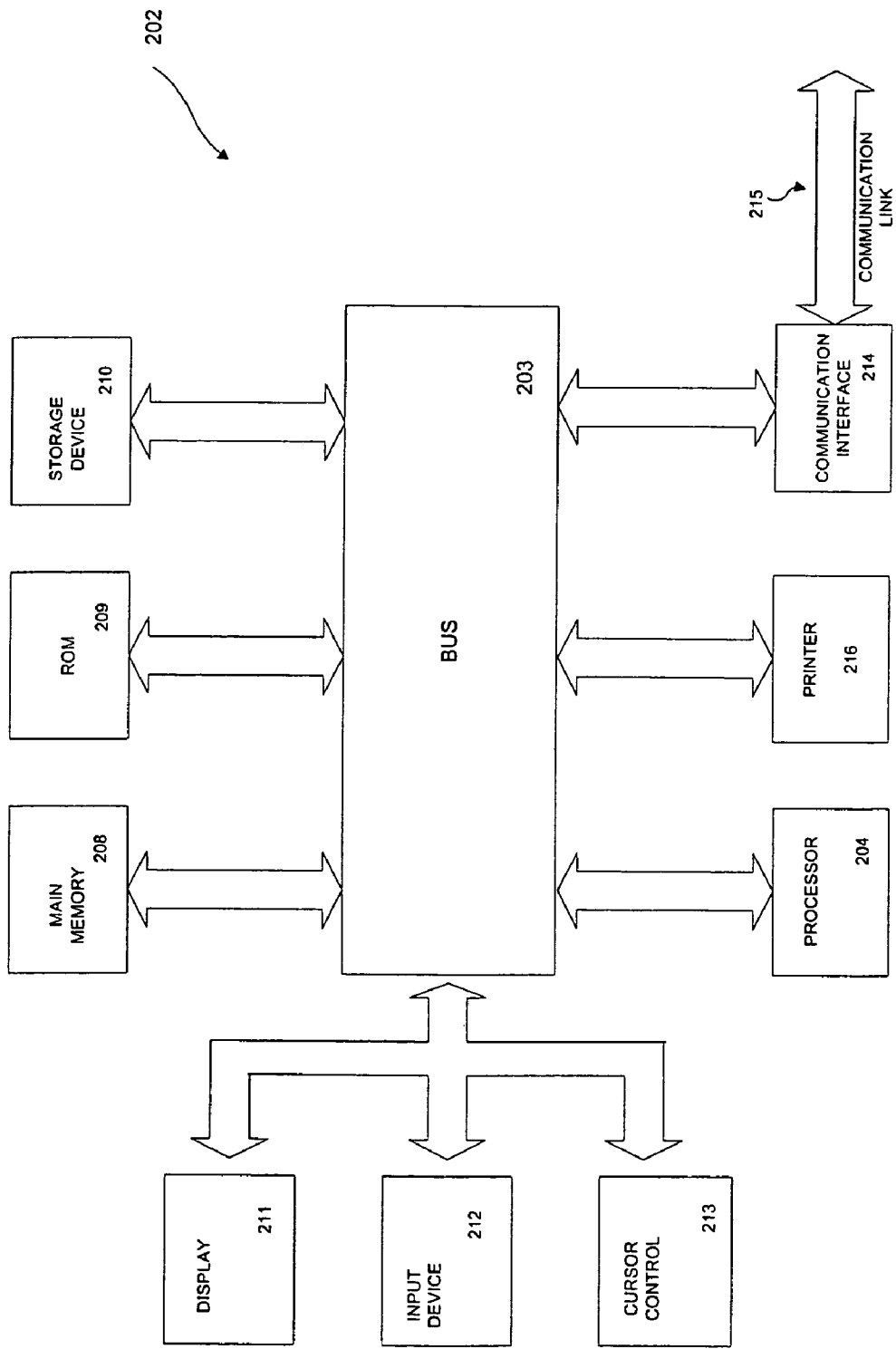
FIG. 2 is a representation of a processing unit used in the computer system of FIG. 1.

Referring to FIG. 2, each user station 124 and the host computer 122 can be referred to generally as a processing unit 202. The processing unit 202 includes a bus 203 or other communication mechanism for communicating instructions, messages and data, collectively, information, and one or more processors 204 coupled with the bus 203 for processing information. The processing unit 202 also includes a main memory 208, such as a random access memory (RAM) or other dynamic storage device, coupled to the bus 203 for storing dynamic data and instructions to be executed by the processor(s) 204. The main memory 208 also may be used for storing temporary data, i.e., variables, or other intermediate information during execution of instructions by the processor(s) 204.

The processing unit 202 further includes a read only memory (ROM) 209 or other static storage device coupled to the bus 203 for storing static data and instructions for the processor(s) 204. A storage device 210, such as a magnetic disk or optical disk, is also provided and coupled to the bus 203 for storing data and instructions for the processor(s) 204.

An output device such as a printer 216 is also provided and coupled to the bus 203, for outputting information to the user.

The processing unit 202 is also coupled via the bus 203 to a display device 211, such as, but not limited to, a cathode ray tube (CRT), for displaying information to a user. An input device 212, including alphanumeric and other keys, is coupled to the bus 203 for communicating information and command selections to the processor(s) 204. Another type of user input device may include a cursor control 213, such as, but not limited to, a mouse, a trackball, a finger pad, or cursor direction keys, for communicating direction information and command selections to the processor(s) 204 and for controlling cursor movement on the display 211.

The individual processing units 202 perform specific operations by their respective processor(s) 204 executing one or more sequences of one or more instructions contained in the main memory 208. Such instructions may be read into the main memory 208 from another computer-usable medium, such as the ROM 209 or the storage device 210. Execution of the sequences of instructions contained in the main memory 208 causes the processor(s) 204 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 204. Such a medium may take many forms, including, but not limited to, non-volatile and volatile media. Non-volatile media, i.e., media that can retain information in the absence of power, includes the ROM 209. Volatile media, i.e., media that can not retain information in the absence of power, includes the main memory 208.

Common forms of computer-usable media include, for example: a floppy disk, flexible disk, hard disk, magnetic tape, any other magnetic medium, CD-ROM, any other optical medium, punch cards, paper tape, any other physical medium with patterns of holes, RAM, ROM, PROM (i.e., programmable read only memory), EPROM (i.e., erasable programmable read only memory), including FLASH-EPROM, any other memory chip or cartridge, or any other medium from which a processor 204 can retrieve information.

Various forms of computer-usable media may be involved in providing one or more sequences of one or more instructions to the processor(s) 204 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 203 may receive the infrared signals and place the instructions therein on the bus 203. The bus 203 may carry the instructions to the main memory 208, from which the processor(s) 204 thereafter retrieves and executes the instructions. The instructions received by the main memory 208 may optionally be stored on the storage device 210, either before or after their execution by the processor(s) 204.

Each processing unit 202 also includes a communication interface 214 coupled to the bus 203. The communication interface 214 provides two-way communication between the processing units 202 (such as, e.g., between a user station 124 and the host computer 122) via a communication link 215. The communication interface 214 of a respective processing unit 202 transmits and receives electrical, electromagnetic or optical signals that include data streams representing various types of information, including instructions, messages and data.

The communication link 215 may be a LAN 125, in which case the communication interface 214 may be a LAN card. Alternatively, the communication link 215 may be a PSTN 128, in which case the communication interface 214 may be an integrated services digital network (ISDN) card or a modem. In addition, as a further alternative, the communication link 215 may be a wireless network 130.

Each processing unit 202 transmits and receives messages, data, and instructions, including program, i.e., application, code, through its respective communication link 215 and communication interface 214. Received program code may be executed by the respective processor(s) 204 as it is received, and/or stored in the storage device 210, or other associated non-volatile media, for later execution. In this manner, a processing unit may receive messages, data and/or program code.

The computer system 120 runs a database management system (DBMS). The database management system is responsible for managing access to the database 132 by various entities. These entities include, for example, users of the host computer 122 or the user stations 124, or other computer programs running on the host computer 122 or the user stations 124. The entities access the database 132 by, for example, submitting queries on the data contained in the database 132. The data contained in the database 132 is stored in various database objects.

Figure 3:
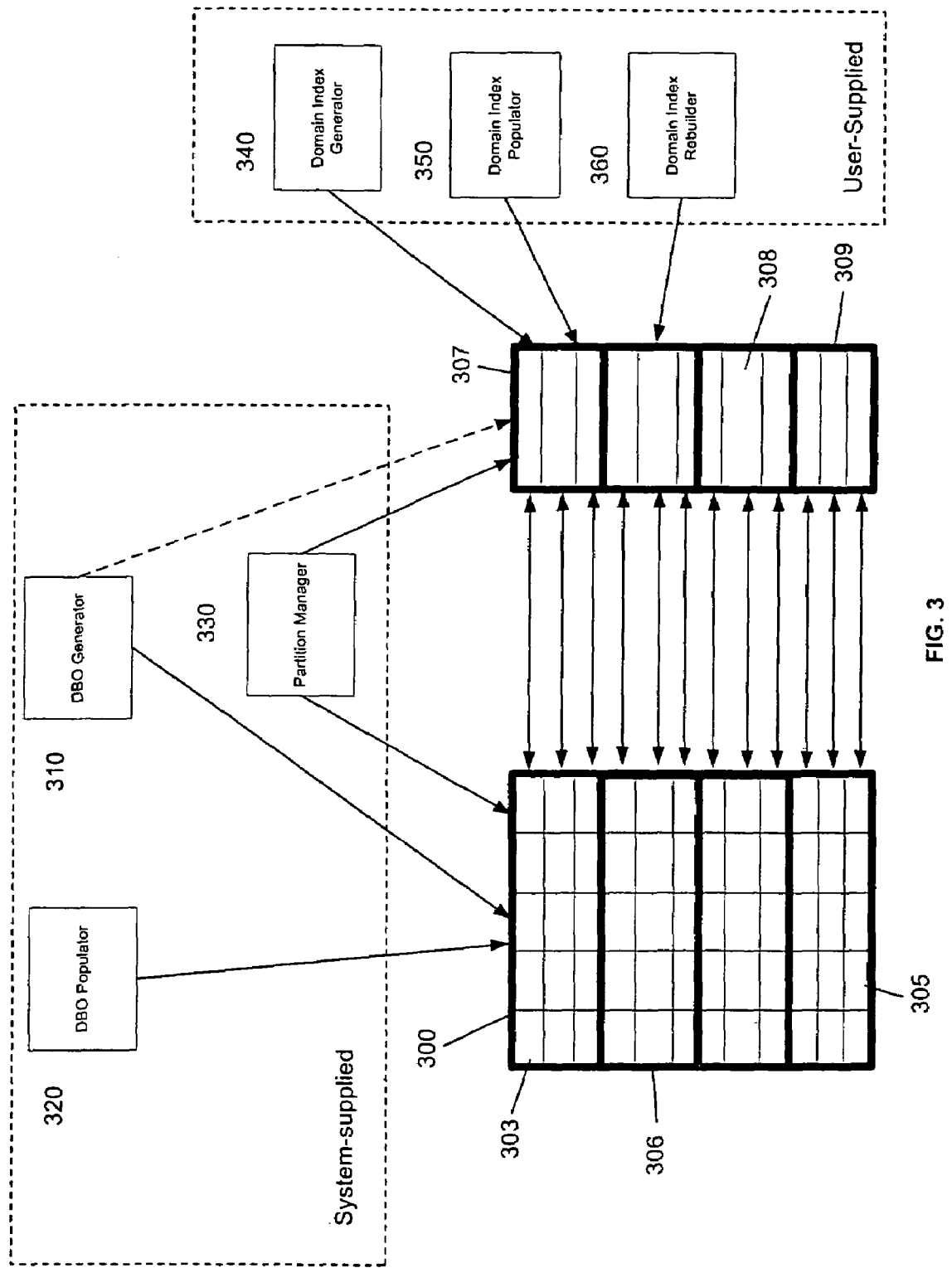
FIG. 3 is a representation of a system for creating and maintaining database objects in a DBMS.

Turning to FIG. 3, a system for creating and maintaining database objects in a DBMS will be discussed using a table 300 and a domain index 307 as examples of database objects. Those skilled in the art will appreciate that the system of FIG. 3 can also be implemented using other types of database objects.

The table 300 includes rows 303 and columns 305, adapted to store data. One example data storage scheme is to store a record, a group of related data items, in a single row 303. Each record includes several fields, which each contain one or more data items. The fields are each stored in separate columns 307. To further enhance the efficiency of the database 132, the table 300 is partitioned into several table partitions 306, according to a table partition function, as discussed above. Each table partition 306 contains one or more rows 303, chosen based on the table partition function.

The domain index 307 includes domain index entries 308, which are associated with the rows 303 of the table 300, as discussed above. For example, the domain index 307 contains an index entry 308 for each row 303 of the table 300. Alternatively, there may be more than one index entry 308 associated with each row 303. The index entries 308 typically contain data taken or derived from a column 305 of the table 300, as discussed above. The domain index 307 is also partitioned into index partitions 309, according to an index partition function. The index partition function is related to the table partition function for the table 300 that the index 307 is associated with. For example, the index partition function may be the same as the table partition function. Alternatively, the index partition function may specify some other partitioning scheme that can relate the index partitions 309 to the table partitions 306 of the table 300.

In general, the table 300 and the index 307 are related such that there is a 1:m relationship between table partitions 306 and index partitions 309, where m is an integer greater than or equal to one. A 1:1 relationship (equi-partitioning) has been found to produce good efficiency results. Thus, the table partition function and the index partition function are associated such that the 1:m relationship between table partitions and index partitions is produced. For example, the table partition function could be a hashing function that divides the data into N groups (e.g. RowID mod N), and the index partition function could be a hashing function that divides the index data into 2N groups (e.g. RowID mod 2N). Under this scheme, two index partitions 309 are related to each table partition 306 (e.g. Integer((RowID mod 8)/2)).

Various modules within the DBMS interact with or operate on the table 300 and/or the domain index 307. The DBMS includes a database object generator 310, which is a code module that generates the various database objects used in the database 132, such as the table 300 and/or the domain index 307. The database object generator 310 of an embodiment is adapted to generate partitioned database objects. The database object generator 310 generates partitioned database objects such as the table 300 by using the table partition function to create a plurality of table partitions 306 within the table 300. For example, if the table partition function specifies that the data to be stored in the table 300 will be partitioned by date range, with each table partition 306 containing data from one month, then the database object generator 310 generates the table 300 partitioned by month.

The database object generator 310 may actually generate one or more table partitions 306 when it generates the table 300. Alternatively, the database object generator 310 may simply generate an empty container and an associated table partition function, without generating the actual table partitions 306 themselves. In this alternative embodiment, the table partitions 306 are generated as needed when the data is loaded into the table 300 by the database object populator 320.

The database object populator 320 populates the table 300 according to the table partition function. Each record is placed into the table partition 306 specified by the application of the table partition function to the record and/or the data contained in the record. For example, assume the table 300 includes a table partition function that partitions the table 300 on a sales date field, based on the month the sale was made. A record having a sales date value of May 13, 2002 is placed into the May, 2002 table partition 306. Similarly, a record having a sales date value of Jan. 14, 2001 is placed in the January, 2001 table partition 306. As discussed above, if the database object populator 320 tries to place a record into a non-existent table partition 306, the database object populator causes a new table partition 306 to be created to contain the record, for example by sending a request to the partition manager 330 to create a new table partition 306.

The partition manager 330 is a code module that manages the various partitions within the table 300 and the domain index 307. The partition manager 330 adds and deletes partitions, splits partitions into two or more new partitions, merges two or more existing partitions into a new partition, and performs other such partition maintenance operations. Various events can cause the partition manager 330 to perform a partition maintenance operation.

For example, the database object generator 310 can send a request to the partition manager 330 to add one or more partitions to a newly generated table 300 or domain index 307. The database object populator 320 can send a request to the partition manager 330 to add a new partition to contain a record bound for a non-existent partition of the table 300. Other modules within the DBMS can also send partition maintenance requests to the partition manager 330. For example, a storage optimizer (riot shown) may notice that a particular partition is being overused, and issue a partition split request to the partition manager 330, to split the overused partition into two or more new partitions. The storage optimizer may also notice that a particular partition is being underused and issue a partition merge request to the partition manager 330, to merge the underused partitions together.

Various modules interact or operate on the domain index 307 as well. These modules may be modules supplied within the DBMS, or they may be user-supplied modules external to the DBMS. In the embodiment of FIG. 3, the domain index 307 is generated by the domain index generator 340. The domain index generator 340 is a code module supplied by a user of the DBMS, such as an independent software vendor or an end-user. Alternatively, a module within the DBMS, such as the database object generator 310, could generate the domain index 307.

The domain index 307 is populated with data by the domain index populator 350, according to the domain index scheme and/or the domain index partition function. Similar to the placement of records into the table partitions 306, each index entry 308 is placed into the index partition 309 specified by the application of the domain index partition function to the index entry 308 and/or the data contained in the index entry 308.

The domain index 307 is rebuilt where necessary by the domain index rebuilder 360. The domain index rebuilder 360 is a user-supplied code module, configured to rebuild domain index partitions 309 according to the domain index scheme specified by the user. The domain index rebuilder 360 may be a separate code module, or it may be incorporated into the domain index populator 350 or domain index generator 340 or another such code module. The domain index rebuilder 360 is adapted to rebuild one or more index partitions 309 of the domain index 307, when the index partitions 309 are marked as unusable.

The partition manager 330 discussed above also interacts with the domain index 307. Whenever the partition manager 330 performs a partition maintenance operation on the table 300, the partition manager 330 performs a corresponding partition maintenance operation on the domain index 307, to preserve the partition relationship between the table 330 and the domain index 307. For example, when the partition manager 330 splits a table partition 300, the partition manager 330 performs a corresponding partition split operation on the domain index 307. Similarly, when the partition manager 330 adds a table partition 306 to the table 300, the partition manager 330 performs a corresponding partition add operation on the domain index 307. The partition manger 330 may under some circumstances perform different operations on the table 300 and the domain index 307. For example, the partition manger 330 may add a new partition to the table 300 and perform a corresponding partition split operation on the domain index 307, to preserve the relationship between table partitions 306 and domain index partitions 309.

The partition manager 330 is responsible for performing partition maintenance operations on both the table 300 and the domain index 307. Therefore, when new partitioning methods are added to the DBMS or other changes to the available partitioning methods are made, only the DBMS-supplied partition manager 330 need be updated to handle the new partitioning methods. The user-supplied code modules 340, 350, 360 are not affected by the addition of additional partition methods, or other changes to the available partitioning methods. Since the index partitions 309 are managed by the DBMS, the domain index developer need not be concerned with designing code modules to perform partition maintenance operations.

Additionally, there is a significant reduction in the number of database objects used to implement the index 307, as compared with conventional methods. Since the index 307 is stored as a single partitioned database object rather than a large number of non-partitioned database objects, the number of database objects in the DBMS is reduced. This also causes a corresponding reduction in the number of cursors needed to process operations on the domain index 307.

Turning to FIG. 4, a method of creating the table 300 and domain index 307 will now be discussed in more detail, with reference to the system of FIG. 3. At step 410, the database object creator 310 creates the table 300. The database object creator 310 may create the table 300 in response to a request from another module within the DBMS, or a request from a user or user-supplied module, or from any other source of database object creation requests. Alternatively the database object creator 310 may create the table 300 based on an internal decision.

At step 420, the database object populator 320 populates the table 300 with data, for example by filling the rows 303 of the table 300 with records. The database object populator 320 may populate the table 300 when the table 300 is first created, or the table 300 may be populated at a later time. At step 430, the domain index creator 340 creates the domain index 307, associated with the table 300. The domain index 307 may be created at any time where it is useful to the operation of the DBMS to have the domain index 307 be created. At step 440, the index populator 350 populates the domain index 307 with data, for example by filling the index entries 308 with index data. The index populator 350 populates the domain index 307 according to the user-defined domain indexing scheme, as discussed above. Finally, at step 450, the domain index 307 is registered with the DBMS, so that the DBMS is aware of the existence of the domain index 307 and can conduct further database maintenance operations on the domain index 307.

A method of managing the table 300 and the index 307 will now be discussed with reference to the flowchart of FIG. 5 and the system of FIG. 3. At step 510 a partition maintenance operation request is issued to the partition manager 330, requesting the partition manager 330 to perform a partition maintenance operation on one or more table partitions 306 of the table 300. At step 520, the partition manager 330 performs the partition maintenance operation on the table 300, modifying, adding or dropping one or more table partitions 306.

At step 530, partition manager 330 identifies the corresponding index partitions 309 in the domain index 307 that correspond to the table partitions operated on in step 520, and truncates these partitions if necessary. Truncation is a very quick operation that results in deleting all the data associated with the partition. One way to truncate an index partition is by dropping the associated index memory block and creating a new empty index memory block. The decision as to whether truncation of any index partitions 309 is necessary is based upon the particular partition maintenance operation and/or upon the particular partition method used. For example, certain partition maintenance operations, such as partition splits and partition merges, trigger the truncation of the existing index partitions 309 being operated on. Other partition maintenance operations, such as add or drop partition operations on range-partitioned or list-partitioned tables, however, do not trigger truncation of existing index partitions 309. An add partition operation on a hash-partitioned table will cause truncation to occur, since the new index partition 309 will be acquiring data from at least one existing index partition 309.

At step 540, the partition manager 330 performs the corresponding partition maintenance operation on the domain index 307, modifying, adding or dropping one or more index partitions 309. At step 550, the partition manager 330 marks the newly-created index partitions 309, if any, as unusable, where necessary. The decision as to whether marking any index partitions 309 unusable is necessary is based upon the particular partition maintenance operation and upon the particular partition method used. For example, partition split operations cause the newly-split index partitions 309 to be marked unusable. Add partition operations on hash-partitioned tables also cause the newly added index partitions 309 to be marked unusable, since these index partitions 309 need to be populated with data re-distributed from other index partitions 309 by the hashing function. Similarly, for a drop partition operation on a hash-partitioned table, the index partitions 309 that are to contain the data from the dropped index partitions 309 are marked unusable. For add and drop partition operations on a range or list partitioned table index, however, it is unnecessary to mark any index partitions 309 as unusable.

At step 560, the user issues an index rebuild operation request on any index partitions 309 marked as unusable by the partition manager 330. This request triggers a user-supplied index rebuild operation, performed by the index rebuilder 360, at step 570. For example, the index rebuild operation scans the indexed column 305 from the corresponding table partition 306, performs any indexing transformations useful to generate the index partition 309, and then populates the index partition 309 with the index data. The domain index 370 now accurately corresponds to the changes made to the table 300 by the partition maintenance operation.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A computer implemented method of creating a domain index of a database table which is partitioned into a partitioned database table, wherein the partitioned database table comprises a plurality of table partitions, comprising:

receiving an index partitioning scheme, the index partitioning scheme being definable by an internal and an external developer to the database management system;
creating a domain index of the database table;
partitioning the domain index into a partitioned domain index which comprises a plurality of domain index partitions based at least in part on the index partitioning scheme, wherein
the index partitioning scheme relates the partitioned domain index to the partitioned database table, and
the act of partitioning the domain index is performed by a processor;
storing, by using a bus, an information about the plurality of domain index partitions in a tangible computer readable medium or a storage device or displaying the information on a display apparatus; and
creating and populating a plurality of index entries into at least some of the plurality of domain index partitions based at least in part on the index partitioning scheme.

2. The computer implemented method of claim 1, further comprising storing the partitioned domain index as a single partitioned database object.

3. The computer implemented method of claim 1, wherein partitioning the domain index comprises creating the plurality of domain index partitions, one or more of the plurality of domain index partitions being associated with each of the plurality of table partitions of the database table.

4. The computer implemented method of claim 3 wherein the each of the plurality of table partitions of the database table and the plurality of domain index partitions have a one to many relationship.

5. The computer implemented method of claim 3 wherein the each of the plurality of table partitions of the database table and the plurality of domain index partitions have a one to one relationship.

6. The computer implemented method of claim 1, wherein one or more of the plurality of index entries are associated with each row of a partitioned database table.

7. The computer implemented method of claim 6, wherein the plurality of index entries include data from the database table.

8. The computer implemented method of claim 4, further comprising:
performing a first maintenance operation on the database table or the partitioned database table; and
performing a second maintenance operation on the domain index or the partitioned domain index to preserve the one to many relationship between the plurality of table partitions and the plurality of domain index partitions.

9. The computer implemented method of claim 5, further comprising:
performing a first maintenance operation on the partitioned database table or the database table; and
performing a second maintenance operation on the domain index or the partitioned domain index to preserve the one or one relationship between the plurality of table partitions and the plurality of domain index partitions.

10. A computer program product embodied on a volatile or non-volatile computer readable medium, the computer readable medium having stored thereon a sequence of instructions which, when executed by a processor, causes the processor to execute a computer implemented process of creating a domain index of a database table which is partitioned into a partitioned database table, wherein the partitioned database table comprises a plurality of table partitions, the process comprising:

receiving an index partitioning scheme, the index partitioning scheme being definable by an internal and an external developer to the database management system;

creating a domain index of the database table;

partitioning the domain index into a partitioned domain index which comprises a plurality of domain index partitions based at least in part on the index partitioning scheme, wherein the index partitioning scheme relates the partitioned domain index to the partitioned database table, and the act of partitioning the domain index is performed by a processor;

storing, by using a bus, an information about a plurality of domain index partitions in a tangible computer readable medium or a storage device or displaying the information on a display apparatus; and creating and populating a plurality of index entries into at least some of the plurality of domain index partitions based at least in part on the index partitioning scheme and storing the plurality of index entries.

11. The computer program product of claim 10, the process further comprising storing the partitioned domain index as a single partitioned database object.

12. The computer program product of claim 10, wherein partitioning the domain index comprises creating the plurality of domain index partitions, one or more of the plurality of domain index partitions being associated with each of the plurality of table partitions of the database table.

13. The method of claim 12 wherein the each of the plurality of table partitions of the database table and the plurality of domain index partitions have a one to many relationship.

14. The method of claim 12 wherein each of the plurality of table partitions of the database table and the plurality of domain index partitions have a one to one relationship.

15. The computer program product of claim 10, wherein one or more of the plurality of index entries are associated with each row of a partitioned database table.

16. The computer program product of claim 15, wherein the plurality of index entries include data from the database table.

17. The computer program product of claim 13, the process further comprising:

performing a first maintenance operation on the partitioned database table; and performing a second maintenance operation on the domain index to preserve the one to many relationship between the plurality of table partitions and the plurality of index partitions.

18. The computer program product of claim 14, the process further comprising:

performing a first maintenance operation on the database table; and performing a second maintenance operation on the domain index to preserve the one to one relationship between the plurality of table partitions and the plurality of domain index partitions.

19. A computer implemented system for creating a domain index of a database table which is partitioned into a partitioned database table, wherein the partitioned database table comprises a plurality of table partitions, the computer implemented system comprising:

a processor configured for:

receiving an index partitioning scheme, the index partitioning scheme being definable by an internal and an external developer to the database management system;

creating a domain index of the database table;

partitioning the domain index into a partitioned domain index which comprises a plurality of domain index partitions based at least in part on the index partitioning scheme, wherein the index partitioning scheme relates the partitioned domain index to the partitioned database table; and creating and populating a plurality of index entries into at least some of the plurality of domain index partitions based at least in part on the index partitioning scheme; and a tangible computer readable medium or a storage device configured for storing, via a bus, an information about the plurality of domain index partitions or a display apparatus configured for displaying the information; and creating and populating a plurality of index entries into at least some of the plurality of domain index partitions based at least in part on the index partitioning scheme.

20. The system of claim 19, further comprising means for storing the partitioned domain index as a single partitioned database object.

21. The system of claim 19, wherein the means for partitioning the domain index comprises means for creating the plurality of domain index partitions, one or more of the plurality of domain index partitions being associated with each of the plurality of table partitions of the database table.

22. The system of claim 21 wherein the each of the plurality of table partitions of the database table and the plurality of domain index partitions have a one to many relationship.

23. The system of claim 21 wherein the each of the plurality of table partitions of the database table and the plurality of domain index partitions have a one to one relationship.

24. The system of claim 19, wherein one or more of the plurality of index entries are associated with each row of a partitioned database table.

25. The system of claim 24, wherein the plurality of index entries include data from the database table.

26. The system of claim 22, in which the processor is further configured for:

performing a first maintenance operation on the partitioned database table or the database table; and performing a second maintenance operation on the domain index or the partitioned domain index to preserve the one to many relationship between the plurality of table partitions and the plurality of domain index partitions.

27. The system of claim 23, in which the processor is further configured for:

performing a first maintenance operation on the database table or the partitioned database table; and performing a second maintenance operation on the domain index or the partitioned domain index to preserve the one to one relationship between the plurality of table partitions and the plurality of domain index partitions.

* * * * *

UNITED STATES PATENT AND TRADEMARK OFFICE
CERTIFICATE OF CORRECTION

PATENT NO. : 7,617,235 B2  Page 1 of 1
APPLICATION NO. : 11/104718
DATED : November 10, 2009
INVENTOR(S) : Jagannathan Srinivasan et al.

It is certified that error appears in the above-identified patent and that said Letters Patent is hereby corrected as shown below:

Title page 2, in column 1, under "U.S. Patent Documents", line 23, delete "Zaig et al." and insert -- Zait et al. --, therefor.

Title page 2, in column 2, under "U.S. Patent Documents", line 4, delete "Zaite et al." and insert -- Zait et al. --, therefor.

In column 7, line 17, delete "(riot shown)" and insert -- (not shown) --, therefor.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,617,235 B2  Page 1 of 1
APPLICATION NO. : 11/104718
DATED : November 10, 2009
INVENTOR(S) : Srinivasan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

Nineteenth Day of October, 2010

David J. Kappos
*Director of the United States Patent and Trademark Office*